March 18, 1952  P. MESHBERG  2,589,415
COCKTAIL SHAKER
Filed April 9, 1946
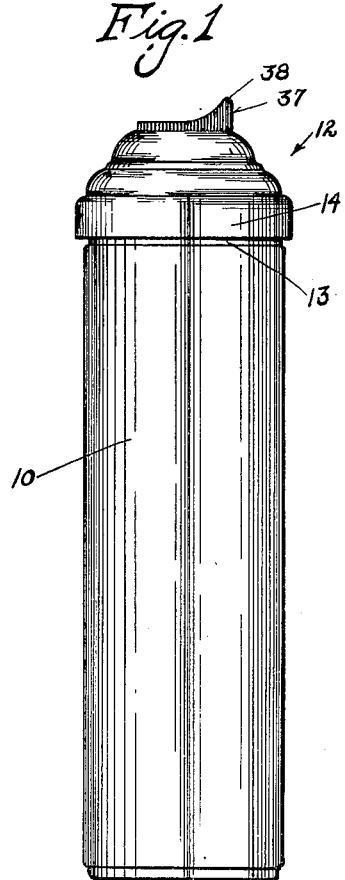
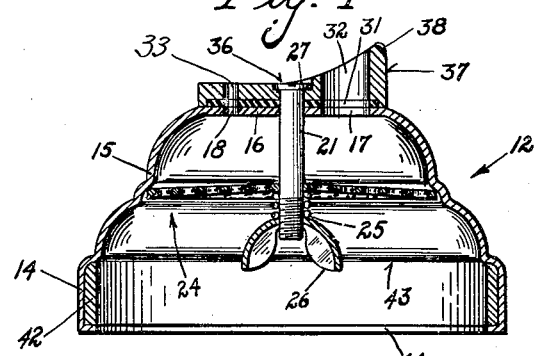
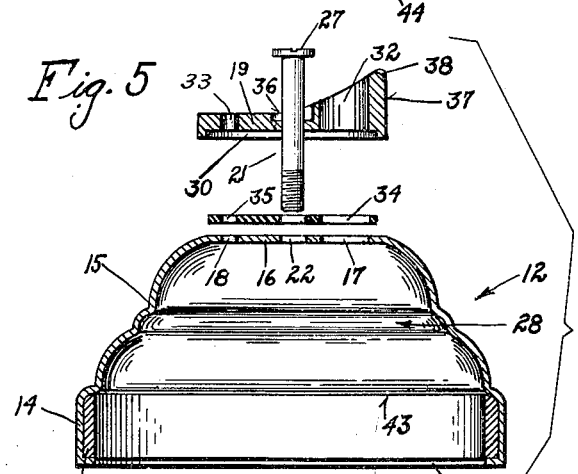
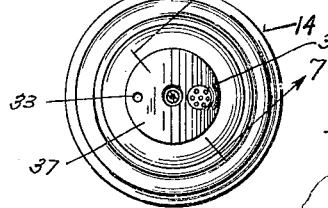
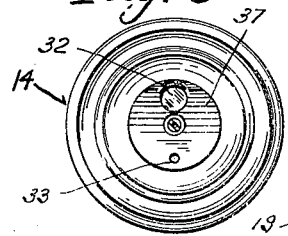
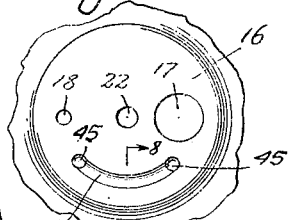
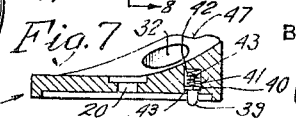
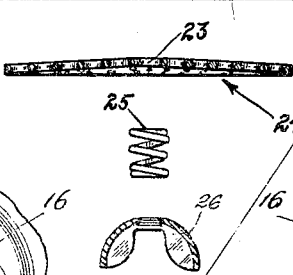
INVENTOR
Philip Meshberg
BY Johnson, Kline & Hensel
ATTORNEYS Patented Mar. 18, 1952

2,589,415

UNITED STATES PATENT OFFICE 2,589,415

COCKTAIL SHAKER

Philip Meshberg, Trumbull, Conn.

Application April 9, 1946, Serial No. 660,781

12 Claims. (Cl. 222—189)

1

This invention relates to cocktail shakers and the like.

An object of the invention is to provide a simple and inexpensive-to-manufacture cocktail shaker which is at the same time convenient to use and effective in operation.

Another object of the invention is to provide a cocktail shaker as above, which has few and simple component parts so arranged and interrelated as to operate in a consistently satisfactory manner throughout the life of the device.

Still another object of the invention is to provide a cocktail shaker of the above characteristics and in which the parts may be easily and quickly dismantled, cleaned and reassembled.

In the specific embodiment of the invention illustrated herein as exemplary thereof, an elongate tubular body or container is provided for holding the ingredients to be mixed, the said container having a novel, frictionally carried and removable cap assembly including straining, stopper and spout means. The cap assembly comprises a cup-like cap body having in its top a pouring or discharge opening and an air vent opening. Externally mounted on the top of the cap body is a unitary spout and stopper member pivotally carried by a pin passing through the said top, the pin also extending through the center of a perforated strainer disk and carrying a coil spring and wing nut which serve to secure the strainer in the cap body, and to hold the spout and stopper member under continual pressure against the exterior of the body.

By the simple operation of removing the wing nut and spring from the pin of the cap assembly, the various component parts of the assembly comprising the strainer, the spout and stopper member and the cap body are quickly and easily separable from each other for cleaning. Also, the component parts may be readily reassembled, since these parts are located and held in place by simply applying the spring and winged nut to the pivot pin after the latter has first been inserted in other components.

Preferably a gasket element is affixed to the spout and stopper member on the inner side thereof, for engagement with the exterior of the cap body. By the provision of the said gasket element, in conjunction with the pivot pin spring, which latter continually holds the spout and stopper member under pressure against the body, virtually no leakage of the contents of the shaker occurs even during violent agitation thereof. A further factor in preventing leakage of the shaker contents is the exterior location of the

2 spout and stopper member, and the arrangement of the closure surfaces thereof with the cooperable surfaces of the cap body. For instance, when the cocktail shaker is held for the purpose of agitating it, the ends of the shaker, i. e., the bottom end and the top or cap assembly end, are grasped in the two hands, inward pressure being applied to the ends during the agitating movements. The pressure on the cap assembly is applied not only to the cap body but also to the spout and stopper member carried exteriorly on the body. This pressure on the member augments the pressure supplied by the spring within the cap assembly, and operates to more tightly hold together the closure surfaces of the member and cap body. Thus, the resultant pressure between the body and the spout and stopper member is quite considerable during the period of agitation of the shaker, and this resultant pressure effectively seals the cap assembly and prevents leakage of the contents of the shaker.

The spout and stopper member, which is a unitary part, is so shaped that pouring of the contents of the shaker may be accomplished without danger of drip or spilling, and thus this member performs a double function in acting as a stopper and as a pouring spout.

Novel detent and movement-limiting means are provided for positioning and yieldably holding the spout and stopper member either in its registering position wherein the contents of the shaker may be poured, or in the non-registering position wherein the openings in the cap body are sealed so that the shaker may be agitated without leakage of the contents. This detent means comprises cooperating sockets and a plunger on the cap and the stopper member, the said plunger yielding slightly in an axial direction during the movement of the member out of either of its positions.

The rim of the cap body, where it engages and fits over the rim of the container, is provided with a flat reinforcing ring which prevents any tendency the rim might have to spread and ultimately become loose on the container, and thereby cause leakage of the contents.

Other features and advantages will hereinafter appear.

In the accompanying drawings:

Figure 1 is a side elevation of a cocktail shaker made in accordance with the invention.

Fig. 2 is a top view of the shaker, with the spout and stopper member in open or registering position to enable the contents of the shaker to be poured out.

Fig. 3 is a view like Fig. 2 but with the spout and stopper member in non-registering position.

Fig. 4 is a diametric section through the cap assembly of the shaker.

Fig. 5 is an exploded diametric section of the cap assembly.

Fig. 6 is a fragmentary plan or top view of the center portion of the cap.

Fig. 7 is a diametric section of the spout and stopper member taken on the line 7—7 of Fig. 2 and Fig. 8 is a fragmentary section of the cap, taken on the line 8—8 of Fig. 6.

Referring to Fig. 1, the cocktail shaker illustrating an embodiment of the present invention comprises a container 10 in the form of an elongate tubular body having a closed bottom 11, the other end of the body carrying, frictionally fitted thereon and removable therefrom, a novel cap assembly 12. The container 10 may have any suitable or desired shape and configuration, it being however preferably provided with a circular mouth portion 13 extending within and closely fitting the peripheral edge portion 14 of the cap assembly 12.

As shown in Figs. 4 and 5, the novel cap assembly 12 of the present invention comprises an inverted cup-shaped body 15, the edge portion 14 of which is adapted to surround and fit over the mouth portion 13 of the container 10. The cap body 15 has a substantially flat top 16 provided near one edge with a relatively large discharge or pouring opening 17, and near an opposite edge with a smaller air vent opening 18.

On the exterior of the top 16 of the body 15 a unique combined spout and stopper member 19 is pivotally mounted, the said member being of circular wafer-like shape and having a central aperture 20, Fig. 6, through which a headed pivot stud 21 extends. The pivot stud 21 passes through a central aperture 22 in the body 15, Fig. 5, and passes through an aperture 23 in the center of a perforated strainer disk 24 which latter is disposed within the body 15. The lower, threaded end of the pivot stud 21 carries a helical compression spring 25 and a wing nut 26 by means of which the strainer disk 24 is secured in place in the body 15. The compression spring 25 also continually exerts an axial force on the pivot stud 21, which force is transmitted through the head 27 thereof to the spout and stopper member 19, so as to hold the latter under continual pressure against the top 16 of the body 15.

As provided by the invention, the body 15 is formed to have an internal shoulder 28 against which the strainer disk 24 is positioned, the said shoulder insuring centralizing of the strainer disk and proper axial alignment of the pivot stud 21. Preferably the central aperture 20 in the spout and stopper member 19 is counterbored as shown at 29 in Fig. 6, to receive the head 27 of the pivot stud 21 so that the head does not project above the outer face of the member.

Referring to Fig. 5, the spout and stopper member 19 is preferably provided with a recess 30 in its undersurface to receive a resilient gasket 31, the latter being secured to the member by any suitable means as for instance with an adhesive, and being adapted to engage the outer surface of the top 16 of the cap body under compression provided by the action of the spring 25. Normally the peripheral portion of the member 19 which surrounds the gasket 31 is spaced slightly from the top 16 of the cap body 15 due to the interposition of the gasket. However, if the force tending to compress the gasket is strong enough, the said peripheral portion of the member may engage the top 16 of the cap, without adversely affecting the operation of the parts.

The spout and stopper member 19 has a discharge or pouring opening 32 and an air vent opening 33 located to align respectively with the corresponding openings of the cap body 15 as shown in Fig. 4. Also, the gasket 31 has pouring and vent openings 34 and 35 respectively, located for registration with the corresponding openings of the member 19 and cap body 15.

Referring to Figs. 2, 4 and 5, the spout and stopper member 19 may occupy a rotative position wherein the pouring and vent openings of the member and of the gasket 31 respectively align and register with the corresponding openings of the cap body 15, and for this position the contents of the container 10 may be poured therefrom. By means of the pivotal mounting of the member 19 the latter may be turned, as through an arc of ninety degrees, to a non-registering or sealing position shown in Fig. 3, wherein the openings in the top 16 of the cap body are closed over and sealed. This is the position to which the member 19 is moved when it is desired to agitate the container 10 and mix the ingredients carried therein.

For the purpose of facilitating the pouring out of the contents of the container 10, and to prevent dripping and spilling of the said contents during the pouring, the spout and stopper member 19 is made of non-uniform thickness as shown in Figs. 4 and 5, and preferably has a concave outer face 36. The thickness of the member 19 increases to a maximum substantially at the edge portion 37 adjacent the pouring opening 32, thus providing a lip 38 which functions in the manner of a spout and enables the contents of the container to be conveniently poured out without danger of dripping or spilling.

It will be seen that the concavity of the outer face 36 of the member 19 causes the lip 38 thereof to be relatively sharp, thus simulating a pouring spout and providing the advantages of the same.

While normally the pressure between the spout and stopper member 19 and the top 16 of the cap body, as provided by the action of the compression spring 25, is sufficient to prevent leakage of the contents of the container 10 when the member is in non-registering position and during violent agitation of the container, a further factor is present which tends to diminish the likelihood of any leakage. It will be understood that, when the cocktail shaker is held for agitation, the bottom 11 of the shaker is grasped in one hand and the cap assembly 12 grasped in the other hand and the hands are pressed towards each other and against the ends, especially during the agitating movements. Thus considerable pressure is exerted, by the hand holding the cap assembly 12, on the spout and stopper member 19 of the assembly. This causes the said member to press with considerable force against the top 16 of the cap body 15, augmenting the pressure provided by the compression spring 25 and further insuring a perfect seal of the apertures in the body.

It will be noted that the novel cap assembly 12 of the present invention is formed of relatively few component parts, these parts comprising the body 15, the spout and stopper member 19, gasket 31, pivot stud 21, strainer disk 24, and spring 25 and wing nut 26. The component parts are of simple shape, and may be quickly and economically manufactured.

The parts of the cap assembly may be easily disassembled for cleaning by merely unscrewing the wing nut 26 and removing the same and the spring 25 from the stud 21, whereupon the strainer disk 24 is removable from the body 15, as well as the spout and stopper member 19. Similarly, the component parts may be quickly and conveniently reassembled by passing the stud 21 through the member 19, body 15, strainer 24, and then applying the spring 25 and wing nut 26 to the threaded end of the stud.

According to the present invention novel detent means are provided for yieldably holding the spout and stopper member 19 in both the registering or pouring position of Figs. 2, 4 and 5, and the non-registering or stoppering position of Fig. 3. This detent means comprises a plunger 39 having an enlarged body 40 which latter is slidably carried in a recess 41 at the undersurface of the spout and stopper member 19, Fig. 7. The plunger 39 is urged outwardly of the recess 41 by a compression spring 42 which is carried on a reduced shank 43 of the plunger, and the body 40 of the latter is retained in the recess by swaging-in the edge 43 thereof to reduce the diameter to less than that of the plunger body.

For cooperation with the plunger 39, the top 16 of the cap body 15 is embossed to provide a curved groove 44 in the outer surface, terminating in sockets 45, see Figs. 6 and 8. The gasket 31 between the spout member 19 and the top 16 of the cap is provided with an opening to enable the plunger 39 to extend through the gasket and engage the said groove, and the said opening and plunger tend to key the gasket 60 to the member and prevent relative turning.

When the spout and stopper member 19 is in place on the cap body 15 and the pouring opening 32 of the member is aligned with the discharge opening 17 of the cap body, the plunger 39 will occupy one of the sockets 45 in the body and will yieldably hold the member 19 against inadvertent shifting. When the spout and stopper member 19 is turned to the position shown in Fig. 3, sealing off the discharge opening 17 of the body 15, the plunger 39 will be shifted out of the socket 45 which it occupied, and shifted along the groove 44 into the opposite socket 45 at the other end of the groove. This latter socket defines the sealing position of the spout and stopper member. The sockets 45 are made of sufficient depth that, together with the plunger 39, they act as positive stops and limit the movement of the spout and stopper member to a predetermined arc as defined by the groove 44, such arc being in the neighborhood of ninety degrees. This is an important feature of the invention since a user is apprised by feel of the two positions of the member. Also, it prevents inadvertent alignment of the pouring opening 32 of the member with the vent opening 18 of the cap, and simultaneous alignment of the vent opening 33 of the member with the discharge opening 17 of the cap. Such alignment would defeat to a considerable extent the satisfactory pouring characteristics of the cap assembly 12.

According to the present invention means are provided for reinforcing the peripheral edge portion 14 of the cap body 15 to prevent spreading of the said portion and consequent leakage of the contents of the container 10 during agitation of the cocktail shaker. This means comprises a flat band or annulus 42 which may be fitted within the peripheral edge portion 14 of the cap body, the said portion having an internal positioning shoulder 43 and an inturned peripheral flange 44 between which latter the reinforcing ring 42 is securely gripped and held. The ring 42 has sufficient cross-section, and is of a material such that it will not spread during use of the cocktail shaker. It will be appreciated that the reinforcing band 42 may be located so as to surround the edge portion 14 of the cap body 10 and still securely reinforce the said edge portion and prevent spreading of the latter.

As shown in Fig. 7, a slight dip or depression 47 is provided in the thick edge portion of the spout and stopper member 19, to enable the pouring of the liquid from the shaker to be accomplished with a relatively narrow stream which obviates any likelihood of spillage.

Variations and modifications may be made within the scope of this invention and portions of the improvements may be used without others.

I claim:

1. A cap for a cocktail shaker, comprising a cup-shaped body having a discharge opening and a vent opening; and a combined spout and stopper member having a generally flat, wafer shape, said member being pivotally mounted on and broadside to the exterior of the said body and having discharge and vent openings located for registration with the corresponding openings of the body, the discharge opening of the member extending between its opposite sides and being located closely adjacent one edge portion thereof, and the thickness of the member being non-uniform and increasing to a maximum substantially at the said edge portion so that the latter constitutes a pouring lip.

2. A cap for a cocktail shaker, comprising a cup-shaped body having a substantially flat top, and having a discharge opening and a vent opening in the top; and a combined spout and stopper member having a generally thin, wafer shape and a concave face, said member being pivotally mounted on and broadside to the exterior of the said body with the concave face out, and the member having discharge and vent openings located for registration with the corresponding openings of the body, the discharge opening of the member extending between its opposite faces and being located closely adjacent one edge portion, and the thickness of the member being non-uniform and increasing to a maximum substantially at the said edge portion so that the latter constitutes a pouring lip, the concavity of the said outer face resulting in the pouring lip being sharp and minimizing the tendency to drip during the pouring.

3. A cap for a cocktail shaker, comprising a cup-shaped body having a discharge opening and a vent opening; a combined spout and stopper member having a generally flat, wafer shape and having discharge and vent openings located for registration with the corresponding openings of the said body; a strainer within the cap body; and means for pivotally mounting the spout and stopper member on and broadside to the exterior of the cap body, and for removably securing the strainer in the body, the said means including a bolt passing through the member, body and strainer, and including a wing nut on the said bolt.

4. A cap for a cocktail shaker, comprising a cup-shaped body having a discharge opening and a vent opening; a combined spout and stopper member having a generally flat, wafer shape and having discharge and vent openings located for registration with the corresponding openings of the said body; a strainer within the cap body;

and means for pivotally mounting the said spout and stopper member on and broadside to the exterior of the cap body under continual yielding pressure, and for removably securing the strainer in the cap body, said means including a bolt passing through the member, body and strainer, and including a compression spring and a wing nut on the said bolt.

5. A cap for a cocktail shaker, comprising a cup-shaped body having a discharge opening and a vent opening; a combined spout and stopper member having a generally flat, wafer shape and having discharge and vent openings located for registration with the corresponding openings of the said body; a strainer within the cap body; means for pivotally mounting the said spout and stopper member on the broadside to the exterior of the cap body under continual yielding pressure, and for removably securing the strainer in the cap body, said means including a bolt passing through the member, body and strainer, and including a compression spring and a wing nut on the said bolt; and a yieldable detent for holding the spout and stopper member in both registering and nonregistering positions.

6. A cap for a cocktail shaker, comprising a body having a discharge opening in its top; a strainer located in the body and positioned thereagainst; a stopper member having a discharge opening located for registration with the discharge opening of the cap body; and means for pivotally mounting the said stopper member on and broadside to the exterior of the cap body, and for removably securing the strainer in the body, the said means including a bolt passing through the member, body and strainer, and including a removable fastening element on the bolt.

7. A cap for a cocktail shaker comprising a cup-shaped body having a discharge opening and a vent opening; a combined spout and stopper member having discharge and vent openings located for registration with the corresponding openings of the cap body; a strainer within the cap body; and means including a pin passing through the cap body, spout and stopper member and the strainer for holding the same together and rotatably mounting the spout and stopper member, the said means also including a spring on the pin, engaging the said strainer and continually applying an axially directed force on the said pin, the said force being transmitted to the spout and stopper member to hold the latter in place under continuous pressure.

8. A cocktail shaker comprising a container open at one end; a removable exposed cap body for closing the open end of the container, the said body having a discharge opening and a vent opening; a combined spout and stopper member pivotally mounted on the exterior of the cap body and having discharge and vent openings located for registration with the corresponding openings of the body, the said spout and stopper member having closure surfaces shutting off the openings of the cap body when the member is pivotally moved from its registering position; and releasable means extending through the stopper member and cap body and holding the closure surfaces of the spout and stopper member against the cap body under pressure, the said member being so located on the exterior of the cap body that hand pressure on the member incidental to holding the body on the container during agitation of the shaker increases the said pressure of the closure surfaces on the body, thereby to more tightly seal the openings of the latter.

9. A cocktail shaker comprising a container open at one end; a removable exposed cap body for closing the open end of the container, the said body having a discharge opening and a vent opening; a combined spout and stopper member pivotally mounted on the exterior of the cap body and having discharge and vent openings located for registration with the corresponding openings of the body, the said spout and stopper member having closure surfaces shutting off the openings of the cap body when the member is pivotally moved from its registering position; and releasable means holding the closure surfaces of the spout and stopper member against the cap body under pressure, the said means including a yieldable detent for holding the member in registering and in non-registering positions, and the said member being so located on the exterior of the cap body that hand pressure on the member incidental to holding the body on the container during agitation of the shaker increases the said pressure of the closure surfaces on the body, thereby to more tightly seal the openings of the latter.

10. A cap for a cocktail shaker comprising a body adapted to be removably secured to the open end of a container; a combined spout and stopper member rotatably mounted on the exterior of the said body, the said member having pouring and vent openings located in a single annular zone about the axis of rotation of the member, and the said body having corresponding openings located for simultaneous registry with the openings of the member; and cooperable means on the said body and on the spout and pouring member, limiting rotative movement of the member to an arc of a circle, the said means being so arranged that the arc of movement of the member is insufficient to enable the pouring opening thereof to align with the vent opening of the said body, and the said means comprising a resiliently mounted plunger and a cooperable arcuate groove on the said body and member, the said groove having depressions at its ends forming detent sockets for the plunger.

11. A cocktail shaker comprising a container open at one end; a removable exposed cap body for closing the open end of the container, the said body having a discharge opening and a vent opening; a combined spout and stopper member pivotally mounted on the exterior of the cap body and having discharge and vent openings located for registration with the corresponding openings of the body, the said spout and stopper member having closure surfaces shutting off the openings of the body when the member is pivotally moved from its registering position; and releasable means holding the closure surfaces of the spout and stopper member against the cap body under pressure, the said means including a removable strainer carried within the body and removable therefrom upon the release of the said means, and the said member being so located on the exterior of the cap body that hand pressure on the member incidental to holding the body on the container during agitation of the shaker increases the said pressure of the closure surfaces on the body, thereby to more tightly seal the openings of the latter.

12. A removable top for cocktail shakers comprising a body having upwardly directed pouring and vent apertures, a valve member rotatably mounted on the body, a resilient washer interposed between the body and valve member and rotatable with the latter, said member and washer having pouring and vent apertures movable into registration with the apertures in the body for pouring purposes, a strainer within the body and located by engagement with the walls thereof, and a bolt extending through the valve member body and strainer, said bolt having a nut beyond the strainer which upon being tightened against the strainer anchors the latter in position and draws the valve member and washer against the apertured surface of the body.

PHILIP MESHBERG.

REFERENCES CITED

The following references are of record in the file of this patent:

UNITED STATES PATENTS

| Number | Name | Date |
| --- | --- | --- |
| 507,410 | Brashear | Oct. 24, 1893 |
| 815,158 | Graham et al. | Mar. 13, 1906 |
| 928,561 | Swain | July 20, 1909 |
| 1,072,171 | Schalk | Sep. 2, 1913 |
| 1,652,696 | Beard et al. | Dec. 13, 1927 |
| 1,731,698 | Anderson | Oct. 15, 1929 |
| 1,765,128 | Conover | June 17, 1930 |
| 2,090,998 | Gessler | Aug. 24, 1937 |
| 2,142,644 | Gould | Jan. 3, 1939 |
| 2,411,058 | Rockwell | Nov. 12, 1946 |

FOREIGN PATENTS

| Number | Country | Date |
| --- | --- | --- |
| 270,437 | Great Britain | May 12, 1927 |